(12) United States Patent
Kino et al.

(10) Patent No.: US 9,948,166 B2
(45) Date of Patent: Apr. 17, 2018

(54) METHOD FOR PRODUCING STATOR (71) Applicant: TOYOTA JIDOSHA KABUSHIKI KAISHA, Toyota-shi Aichi (JP)

(72) Inventors: Masahiro Kino, Toyota (JP); Masashige Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 14/610,275

(22) Filed: Jan. 30, 2015

(65) Prior Publication Data
US 2015/0256055 A1  Sep. 10, 2015

(30) Foreign Application Priority Data
Mar. 4, 2014 (JP) ................... 2014-041563

(51) Int. Cl.
B29C 45/16 (2006.01)
H02K 15/02 (2006.01)
H02K 3/52 (2006.01)
H02K 15/12 (2006.01)
B29C 45/14 (2006.01)
(Continued)

(52) U.S. Cl.
CPC ....... *H02K 15/02* (2013.01); *B29C 45/14467* (2013.01); *B29C 45/16* (2013.01); *H02K 3/522* (2013.01); *H02K 15/12* (2013.01); *B29C 45/14065* (2013.01); *B29L 2009/00* (2013.01); *B29L 2031/34* (2013.01); *H02K 1/148* (2013.01); *H02K 15/022* (2013.01)

(58) Field of Classification Search
CPC .............. B29C 45/14467; B29C 45/14; B29C 45/14639; B29C 2045/14459; H02K 15/02; H02K 15/12

USPC ...... 264/259, 217.19, 272.2, 272.11, 272.15, 264/275, 263, 279
See application file for complete search history.

(56) References Cited

U.S. PATENT DOCUMENTS 8,230,580 B2 * 7/2012 Kiyono ................ H02K 15/12
29/596

FOREIGN PATENT DOCUMENTS

JP    S62-48164 U    3/1987
JP    H06-233489     8/1994
(Continued)

OTHER PUBLICATIONS

English abstract of JP2010246269.*
English abstract of JP2007288821.*

*Primary Examiner* — Christina Johnson
*Assistant Examiner* — Xue Liu
(74) *Attorney, Agent, or Firm* — Oliff PLC (57) ABSTRACT

A method that can produce a high-performance stator by providing only an upper or lower fixed piece for latching a coil on an insulator and thus effectively suppressing loosening of the coil winding wire when resin is injected while improving the production efficiency of the insulator. The method includes producing an intermediate by disposing a coil around an insulator, which includes a tubular portion, a flange at one end thereof, and a fixed piece that, when the insulator is loosely fit around the tooth, extends in the radial direction of the tooth from an end side of the flange corresponding to an upper or lower end face of the tooth, and has a coil latching claw, and loosely fitting the insulator with the coil around the tooth; and placing the intermediate in a die and injecting resin from around a region where the coil is latched by the fixed piece.

6 Claims, 10 Drawing Sheets

(51) Int. Cl.
*B29L 9/00* (2006.01)
*B29L 31/34* (2006.01)
*H02K 1/14* (2006.01)

(56) References Cited

FOREIGN PATENT DOCUMENTS

| | | | |
|---|---|---|---|
| JP | 2002-291186 A | | 10/2002 |
| JP | 2007288821 A | * | 11/2007 |
| JP | 2010141962 A | | 6/2010 |
| JP | 2010246269 A | | 10/2010 |

* cited by examiner

RELATED ART

RELATED ART

FIG. 8

RELATED ART

METHOD FOR PRODUCING STATOR

CLAIM OF PRIORITY

The present application claims priority from Japanese patent application JP2014-041563 filed on Mar. 4, 2014, the content of which is hereby incorporated by reference into this application.

BACKGROUND

Technical Field

The present invention relates to a method for producing a stator by disposing an insulator with a coil around each tooth of a stator and integrally sealing the stator and the coil with a sealing resin body.

Background Art

In order to reduce noise of motors, a method has been applied that disposes an insulator with a coil around each tooth of a stator core, and molds resin around the tooth and the coil to integrally seal them with a sealing resin body.

In molding of such a sealing resin body, it is concerned that when a stator core, which has an insulator with a coil disposed around its tooth, is placed in a die and resin is injected into the die, the coil or the insulator may move or deform due to the pressure of the resin. Such a problem is prominent not in the method of forming a coil by directly winding a winding wire around a tooth but in the method of disposing a coil, which is obtained by winding a winding wire in advance, around a tooth with an insulator (or insulating paper) interposed therebetween.

Figure 5:
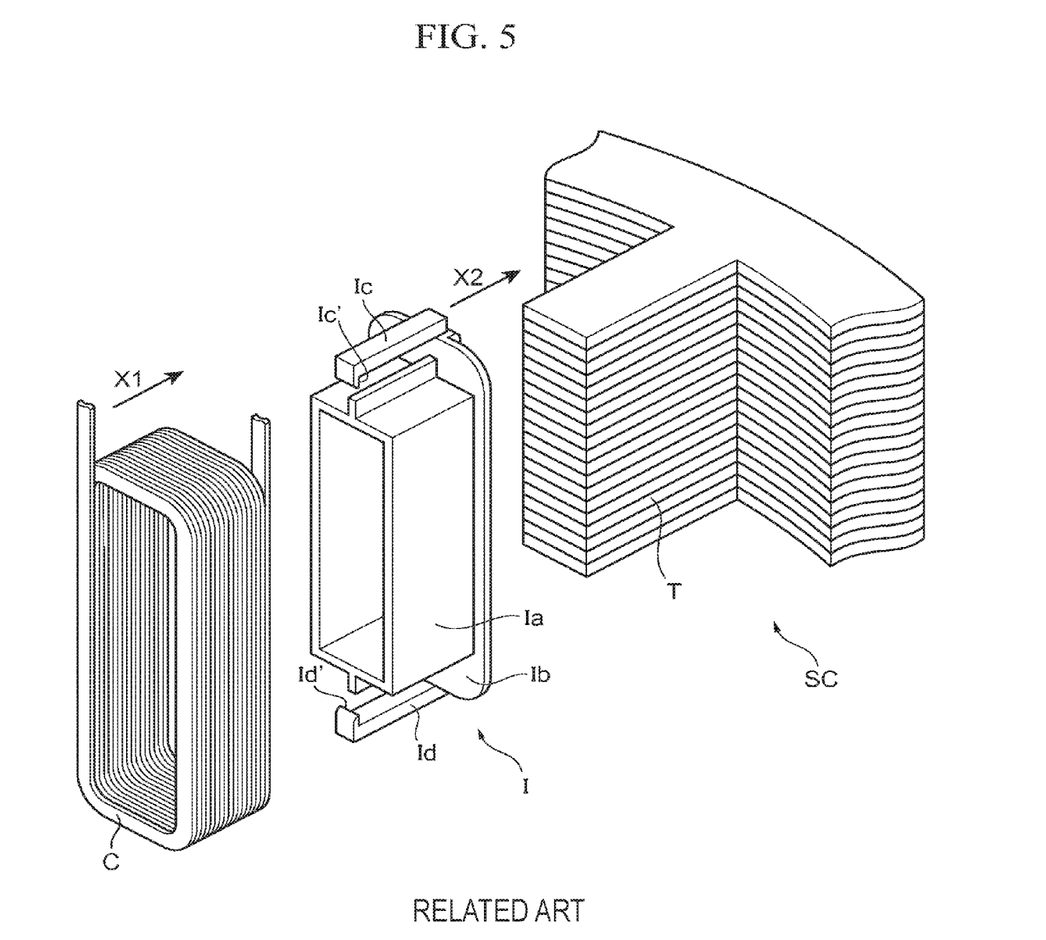
FIG. 5 is a schematic view illustrating a process up to the production of an intermediate in Embodiment 1 of the conventional method for producing a stator.

Herein, the conventional method for producing a stator (Embodiment 1 of the conventional production method) will be described with reference to FIGS. 5 to 7. Although FIG. 5 illustrates only a part of a stator core, the stator core practically has a plurality of teeth that are disposed in circumferential direction and extend radially. In the method shown in FIG. 5, an insulator with a coil is loosely fit around each tooth and is placed in a die.

In the method shown in FIG. 5, insulation between the coil and each tooth is achieved using an insulator. An insulator I shown in the drawing includes a tubular portion Ia adapted to be loosely fit around a tooth T of a stator core S, which is formed by laminating electromagnetic steel plates, a flange Ib provided at one end of the tubular portion Ia, and fixed pieces Ic and Id that, when the insulator I is loosely fit around the tooth T (in the X2 direction), extend in the radial direction of the tooth T from two end sides of the flange Ib corresponding to the upper and lower end faces of the tooth T, and have claws Ic' and Id' for latching a coil C at the respective tip ends of the fixed pieces Ic and Id.

As described above, the coil C that is loosely fit around the tubular portion Ia (in the X1 direction) is latched by the two upper and lower fixed pieces Ic and Id, and then, the insulator I with the coil C is loosely fit around the tooth T. This is executed on all of the teeth T of the stator core SC.

Figure 6A:
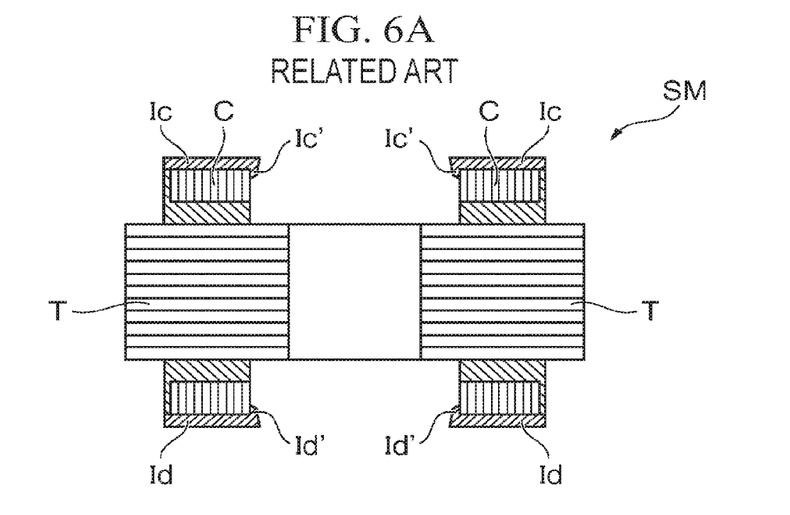
FIG. 6A is a longitudinal sectional view of the produced intermediate.
Figure 7:
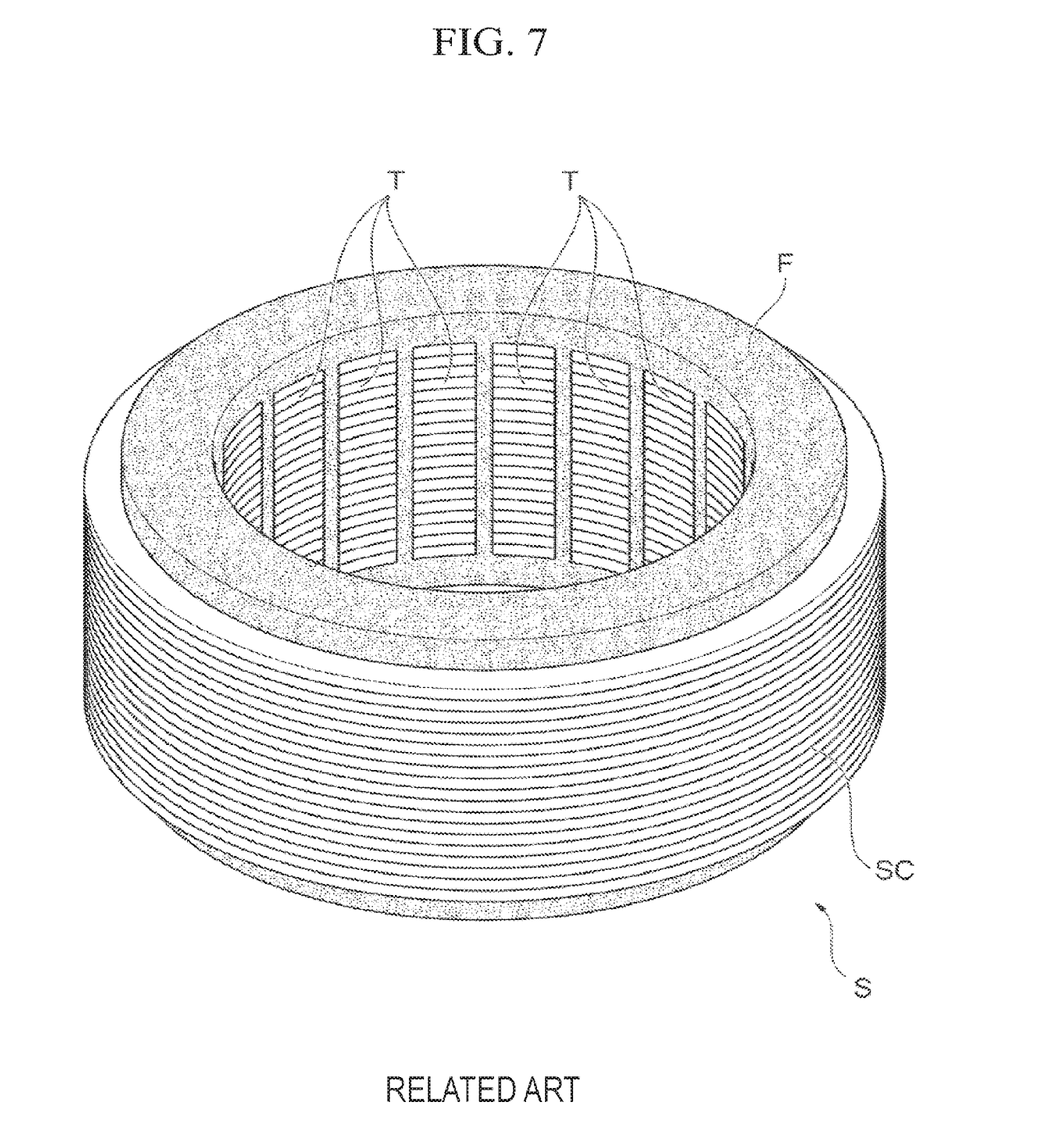
FIG. 7 is a perspective view showing a stator produced in Embodiment 1 of the conventional method for producing a stator.

When the insulator I with the coil C is loosely fit around each tooth T, an intermediate SM that is a precursor of the stator as a final product is produced as shown in FIG. 6A.

Figure 6B:
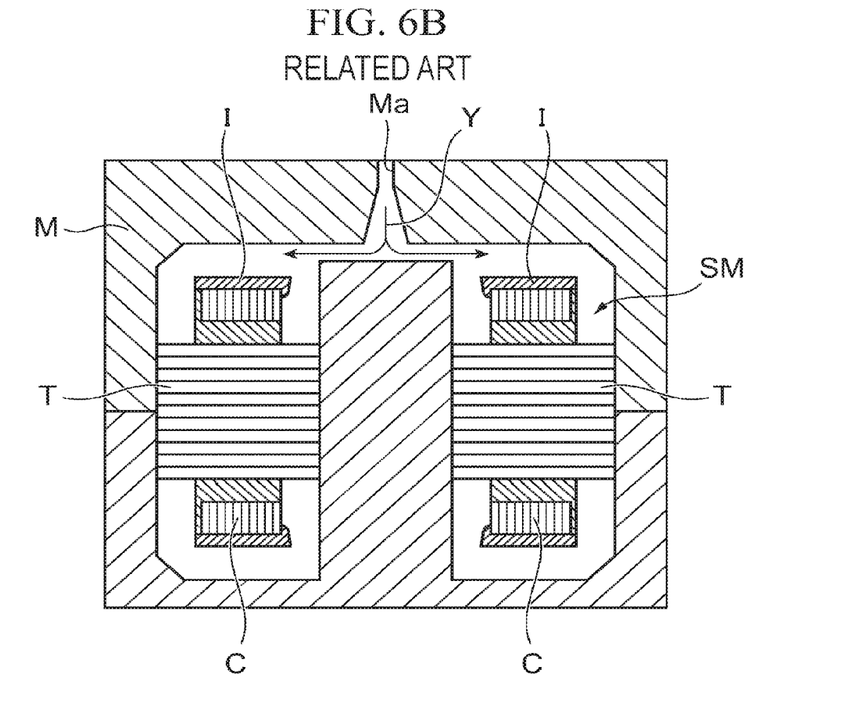
FIG. 6B is a schematic view illustrating a circumstance in which the intermediate is placed in a die and resin is injected into the die.

Next, as shown in FIG. 6B, the intermediate SM is placed in a die M and the die M is closed (FIG. 6B shows a state in which the die is closed), and then, resin is injected into an injection gate Ma provided in the die M (in the Y direction).

The resin is injected into regions around the teeth T, the insulators I, and the coils C. Then, after the resin has hardened, the components are removed from the die. Accordingly, a stator S is produced as shown in FIG. 7 in which the insulator and the coil disposed around each tooth T of the stator core SC are integrally sealed by a sealing resin body F.

In such a production method, when resin is injected into the die shown in FIG. 6B, the latched state of the coil C is maintained by the two upper and lower fixed pieces Ic and Id of the insulator I. Thus, movement of the coil C relative to the insulator I, which would otherwise occur due to the pressure of the injected resin, is suppressed. With respect to the suppression of the movement of the insulator I relative to the tooth T due to the pressure of the injected resin, movement of the insulator I is also suppressed as the resin is injected from the inner side of the insulator I (i.e., claw side of the fixed pieces) and the insulator I is thus pressed against the root side (i.e., yoke side) of the tooth T due to the pressure of the resin. As the insulator I is pressed against the root side of the tooth T (i.e., outer side of the stator core) as described above, it is possible to solve the problem of the performance deterioration of the stator resulting from an increase in copper loss that would be problematic if the coil C is disposed on the inner side (i.e., rotor side) of the stator core.

However, as the insulator I has the two fixed pieces Ic and Id at the top and the bottom thereof, there is a problem in that high labor and cost are required for producing the insulator I.

To address such a problem, Patent Document 1 discloses an insulator with a single fixed piece. A method for producing a stator that uses such an insulator (Embodiment 2 of the conventional production method) will be described with reference to FIGS. 8 and 9.

Figure 8:
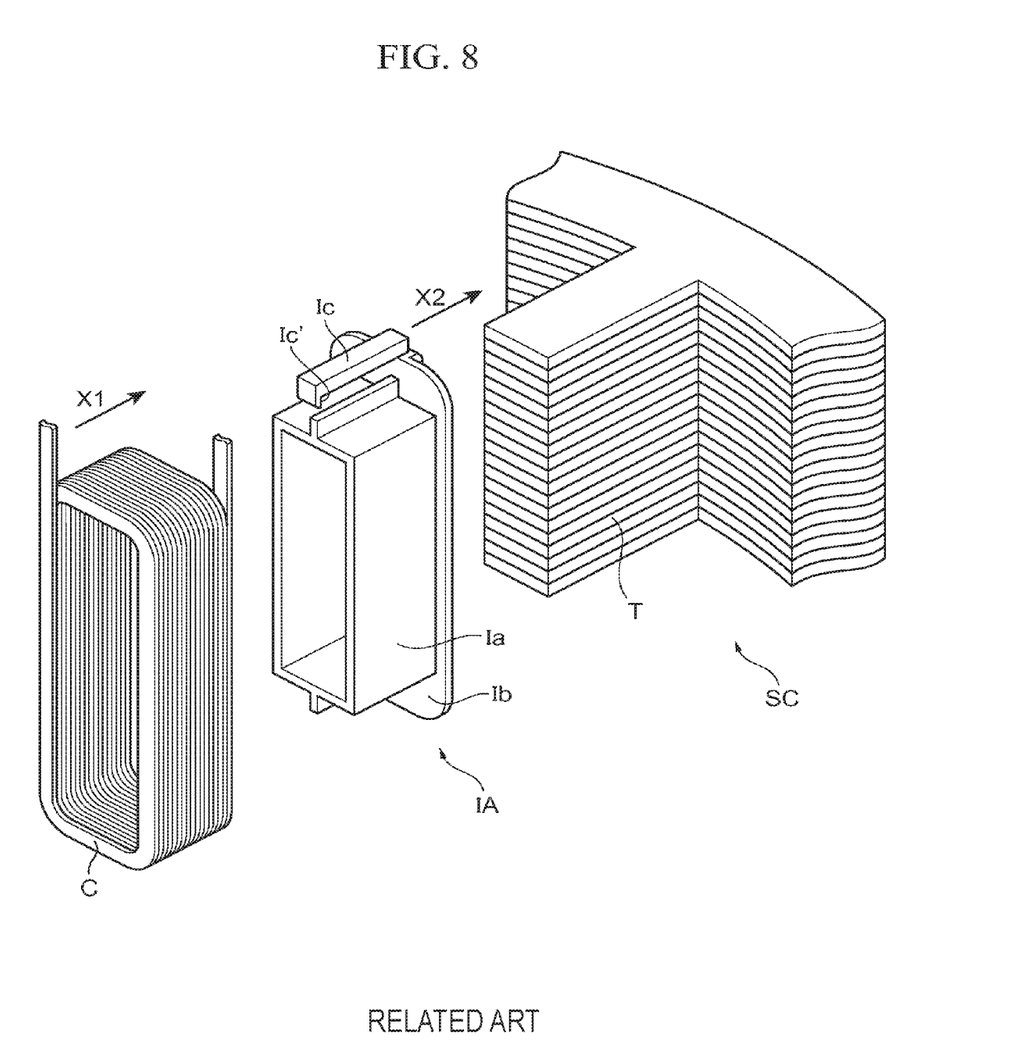
FIG. 8 is a schematic view illustrating a process up to the production of an intermediate in Embodiment 2 of the conventional method for producing a stator.

As shown in FIG. 8, an insulator IA includes a tubular portion Ia adapted to be loosely fit around each tooth T, a flange Ib provided at one end of the tubular portion Ia, and a fixed piece Ic that, when the insulator I is loosely fit around the tooth T (in the X2 direction), extends in the radial direction of the tooth T from one end side of the flange Ib corresponding to the upper end face of the tooth T, and has a claw Ic' for latching a coil C at the tip end of the fixed piece Ic.

Figure 9A:
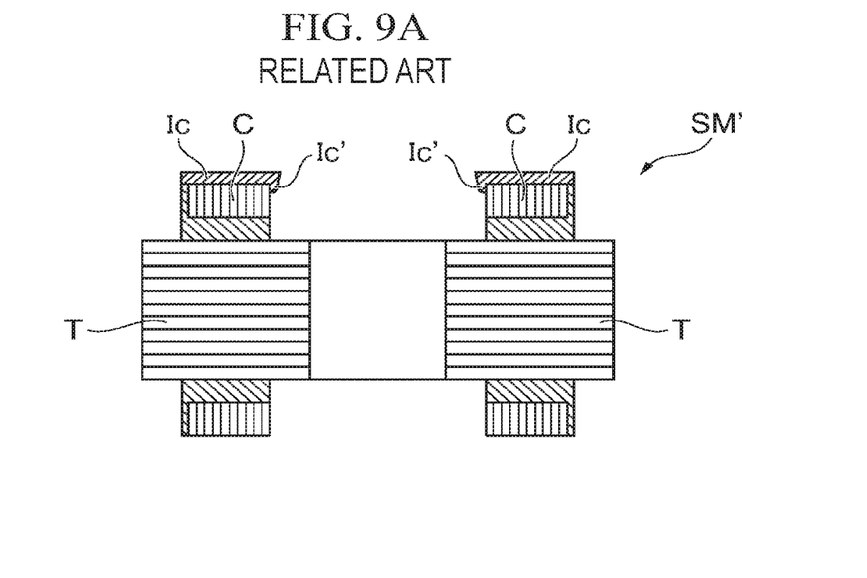
FIG. 9A is a longitudinal sectional view of the produced intermediate.

The coil C that is loosely fit around the tubular portion Ia (in the X1 direction) is latched only by the single upper fixed piece Ic, and then, the insulator IA with the coil C is loosely fit around the tooth T. This is executed on all teeth T of the stator core SC so that an intermediate SM' shown in FIG. 9A is produced.

Figure 9B:
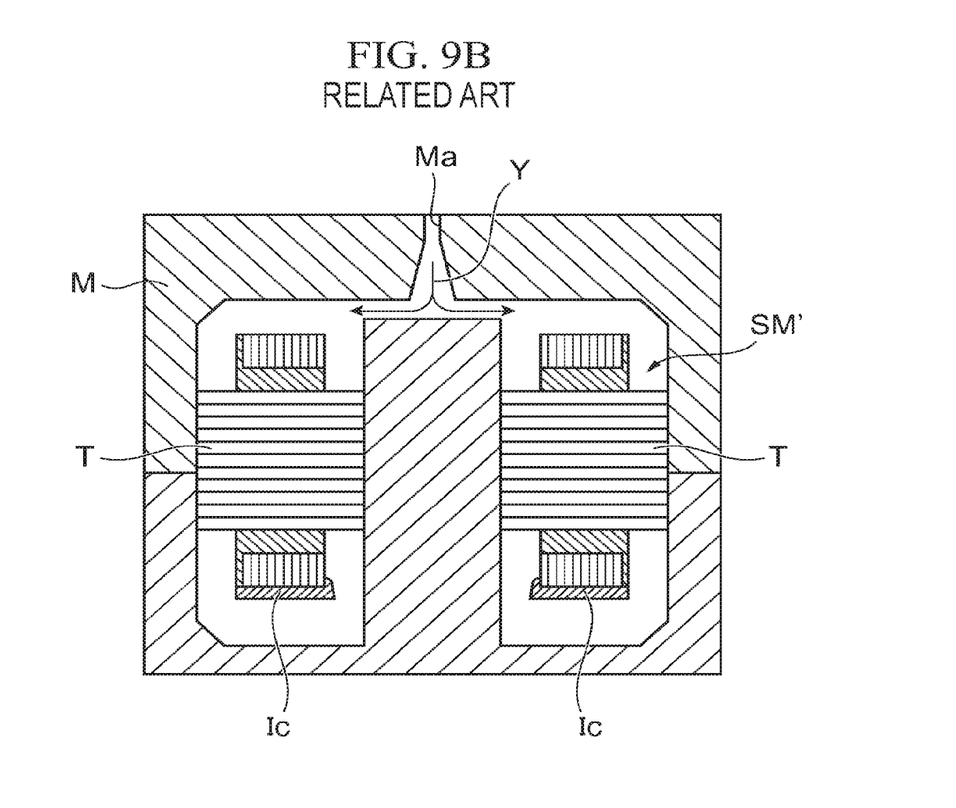
FIG. 9B is a schematic view illustrating a circumstance in which the intermediate is placed in a die and resin is injected into the die.

Next, as shown in FIG. 9B, the intermediate SM' is placed in a die M, and resin is injected into an injection gate Ma (in the Y direction).

Figure 9C:
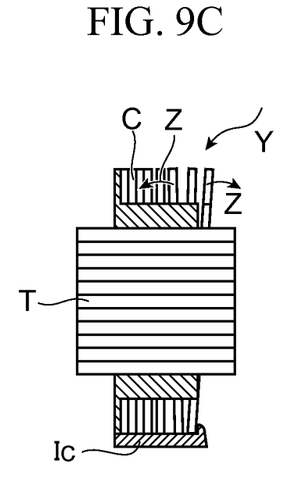
FIG. 9C is a schematic view illustrating that a winding wire of a coil has become loose due to the pressure of resin.

However, as shown in FIG. 9C, when the resin is injected, another problem can occur that a winding wire of the coil C on the side where the coil C is not directly latched by the fixed piece Ic may become loose (in the Z direction).

RELATED ART DOCUMENTS

Patent Documents

Patent Document 1: JP 2010-141962 A

SUMMARY

The present invention has been made in view of the foregoing problems, and relates to a method for producing a stator by loosely fitting an insulator with a coil around each tooth and integrally sealing them with a sealing resin body. It is an object of the present invention to provide a method for producing a stator that can produce a high-performance stator by providing a fixed piece for latching a coil only at one of the top or the bottom of an insulator and thus effectively suppressing loosening of a winding wire of the coil when resin is injected while improving the production efficiency of the insulator.

In order to achieve the above object, the method for producing a stator of the present invention includes a first step of producing an intermediate by disposing a coil around an insulator, the insulator being adapted to be loosely fit around a tooth of a stator core and including a tubular portion adapted to be loosely fit around the tooth, a flange provided an one end of the tubular portion, and a fixed piece that, when the insulator is loosely fit around the tooth, extends in the radial direction of the tooth from an end side of the flange corresponding to one of an upper end face or a lower end face of the tooth, and has a coil latching claw at a tip end of the fixed piece, causing the coil to be latched by the claw, and loosely fitting the insulator with the coil around the tooth; and a second step of producing a stator by placing the intermediate in a die and injecting resin into the die from around a region where the coil is latched by the fixed piece, thereby forming a sealing resin body around the tooth and the coil.

In the method for producing a stator in accordance with the present invention, an intermediate is first produced by causing a coil to be latched only by a single fixed piece of an insulator, and then freely fitting the insulator around a tooth. Then, resin is injected into a die from around a region where the coil is latched by the fixed piece. Accordingly, loosening of a winding wire of the coil, which would otherwise occur due to the injected resin, can be suppressed by the fixed piece.

The injected resin flows in from the side of the fixed piece of the insulator. As the coil is latched by the fixed piece in a region around the fixed piece, the winding wire of the coil will not become loose. The resin flows from the region around the fixed piece of the insulator toward the other side where the fixed piece is not attached. At this time, the resin flows along a surface on the inner side of the coil (i.e., inner side in the radial direction of the tooth). Thus, the coil is pressed against the outer side (i.e., root side of the tooth) due to the pressure of the resin. Thus, the coil will not become loose in the entire region, and is surrounded by the resin in an attitude in which the coil is disposed on the outer side of the tooth and copper loss is small.

Thus, it is possible to produce a high-performance stator with small copper loss by providing only one fixed piece on an insulator and thus preventing loosening of a winding wire of a coil using resin injected into a die while increasing the production efficiency of the insulator, and also by positioning the insulator and the coil on the outer side of the stator core.

Herein, the insulator may also include a first fixed piece and a second fixed piece, the first fixed piece extending in the radial direction of the tooth from the end side, and the second fixed piece being provided around the first fixed piece, so that a double-layer wound coil may be latched by the insulator such that a first single-layer wound coil is latched by the first fixed piece, and a second single-layer wound coil is latched by the second fixed piece.

As described above, even when an insulator for double layer winding is used, it is possible to integrally mold a sealing resin body around the insulator and a double-layer coil while preventing loosening of the double-layer coil when resin is injected, only by providing two fixed pieces on one of the top or bottom side of the insulator. In addition, as the number of fixed pieces of the insulator is reduced, the production cost thereof can be reduced. It should be noted that it is preferable to produce a stator with a sealing resin body by producing an intermediate by loosely fitting an insulator with a coil around each tooth of the stator in the first step, placing the intermediate in a die, and injecting resin into the die.

Besides, the production method of the present invention is also applicable to a split stator. In such a case, the method includes the first step of producing the intermediate by loosely fitting an insulator with a coil around a tooth of each split core, and fitting together each split core with the coil in the circumferential direction.

As can be understood from the foregoing description, according to the method for producing a stator of the present invention, after an intermediate is produced by causing a coil to be latched only by a single fixed piece of an insulator, resin is injected into a die from around a region where the coil is latched by the fixed piece, whereby loosening of a winding wire of the coil, which would otherwise occur due to the injected resin, can be suppressed by the presence of the fixed piece. Further, with the flowing resin, it is possible to provide the pressure of the resin from the inner side of the coil, and thus press the insulator and the coil against the outer side of the stator core. Thus, providing a fixed piece for latching the coil at only one of the top or bottom side of the insulator can produce a high-performance stator with small copper loss while at the same time improving the production efficiency of the insulator.

DETAILED DESCRIPTION OF THE EMBODIMENT(S)

Hereinafter, embodiments of a method for producing a stator of the present invention will be described with reference to the drawings.

(Embodiment of Method for Producing Stator)

Figure 1:
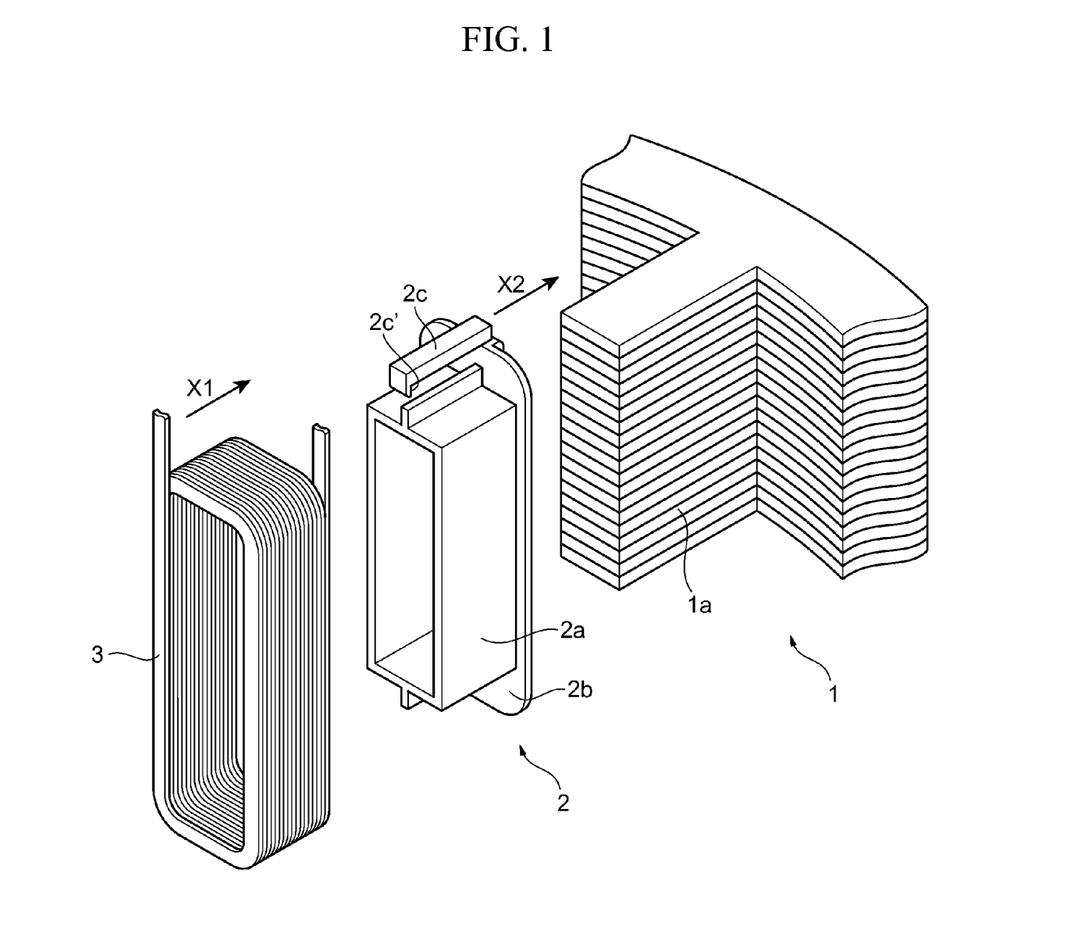
FIG. 1 is a schematic view illustrating a first step of a method for producing a stator of the present invention.
Figure 2A:
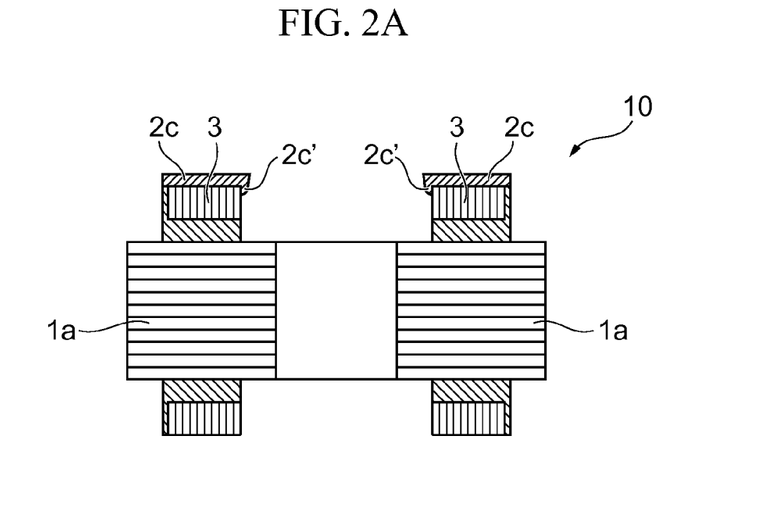
FIG. 2A is a longitudinal sectional view of an intermediate produced in the first step.
Figure 2B:
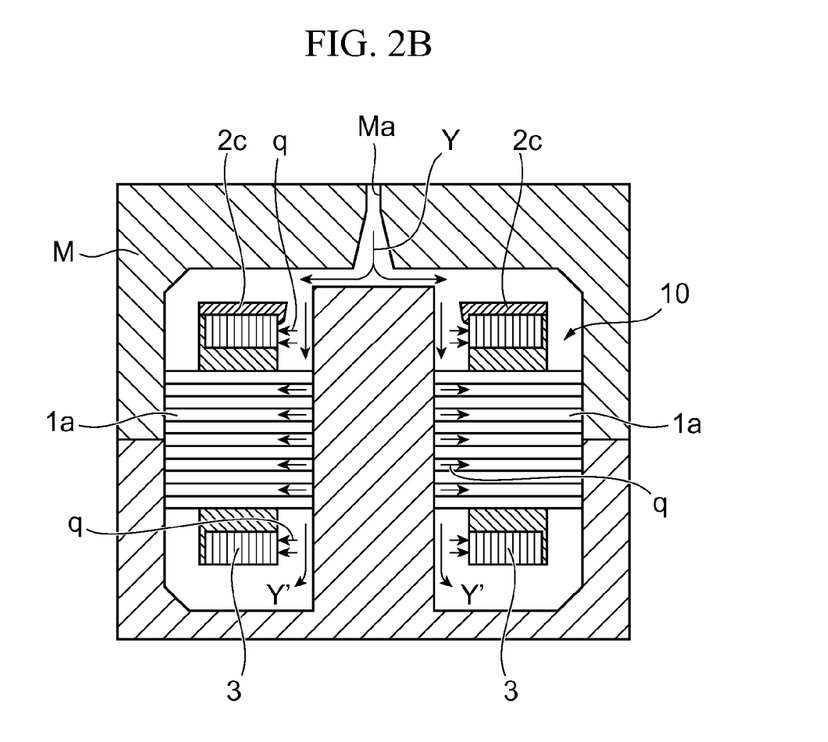
FIG. 2B is a schematic view illustrating a second step of the production method.

FIG. 1 is a schematic view illustrating a first step of a method for producing a stator of the present invention. FIG. 2A is a longitudinal sectional view of an intermediate produced in the first step, and FIG. 2B is a schematic view illustrating a second step of the production method.

As shown in FIG. 1, an insulator 2 is compatible with single-layer winding, and includes a tubular portion 2a, which is adapted to be loosely fit around each tooth 1a of a stator core 1, a flange 2b provided an one end of the tubular portion 2a, and a fixed piece 2c that, when the insulator 2 is loosely fit around the tooth 1a (in the X2 direction), extends in the radial direction of the tooth 1a from one end side of the flange 2b corresponding to the upper end face of the tooth 1a and has a claw 2c' for latching a coil 3 at the tip end of the fixed piece 2c. It should be noted that the stator core 1 is formed by laminating a plurality of electromagnetic steel plates, each of which has a yoke and a plurality of teeth 1a radially extending from the yoke, to a predetermined height and mutually crimping them.

The coil 3 that is loosely fit around the tubular portion 2a (in the X1 direction) is latched only by the single upper fixed piece 2c. Specifically, the coil 3 is loosely fit around the tubular portion 2a so that an end of the coil 3 is latched by the claw 2c' at the tip end of the fixed piece 2c, so that an attitude in which the coil 3 is latched by the insulator 2 is formed.

The insulator 2 with the coil 3 is loosely fit around the tooth 1a. This is executed on all teeth 1a of the stator core 1 so that an intermediate 10 shown in FIG. 2A is produced (first step).

It should be noted that when the stator core 1 shown in the drawing is a split core, the insulator 2 with the coil 3 is loosely fit around each split core having the tooth 1a as shown in FIG. 1. Then, each split core is fitted together in the circumferential direction so that an intermediate of the split stator is produced.

Next, the intermediate 10 is placed in a die M as shown in FIG. 2B.

At this time, the intermediate 10 is placed in the die M such that the fixed piece 2c of the insulator 2 is disposed on the side of an injection gate Ma of the die M.

Next, resin is injected into the die via the injection gate Ma of the die M (in the Y direction). Resin that is injected into the die M flows from the side of the fixed piece 2c of the insulator 2. However, as the coil 3 is latched by the fixed piece 2c in a region around the fixed piece 2c, the winding wire will not become loose.

The injected resin flows from the region around the fixed piece 2c of the insulator 2 to the other side where the fixed piece 2c is not attached (in the Y' direction). In order to ensure a smooth flow of the resin (in the Y' direction), it is preferable to form a resin flow passage by adjusting the radial length of the tooth 1a and the radial length (i.e., thickness) of the coil 3.

In the process in which resin flows toward the other side where the fixed piece 2c is not attached, pressure q, which presses the coil 3 against the outer side of the stator core 1 (i.e., root side of the tooth 1a), acts upon a surface on the inner side of the coil 3 (i.e., inner side in the radial direction of the tooth 1a).

Due to the pressure q that presses the coil 3 against the outer side, the coil 3 does not become loose in the entire region, and is surrounded by the resin injected in the state in which the coil 3 is pressed against the root side of the tooth 1a together with the insulator 2.

Figure 3:
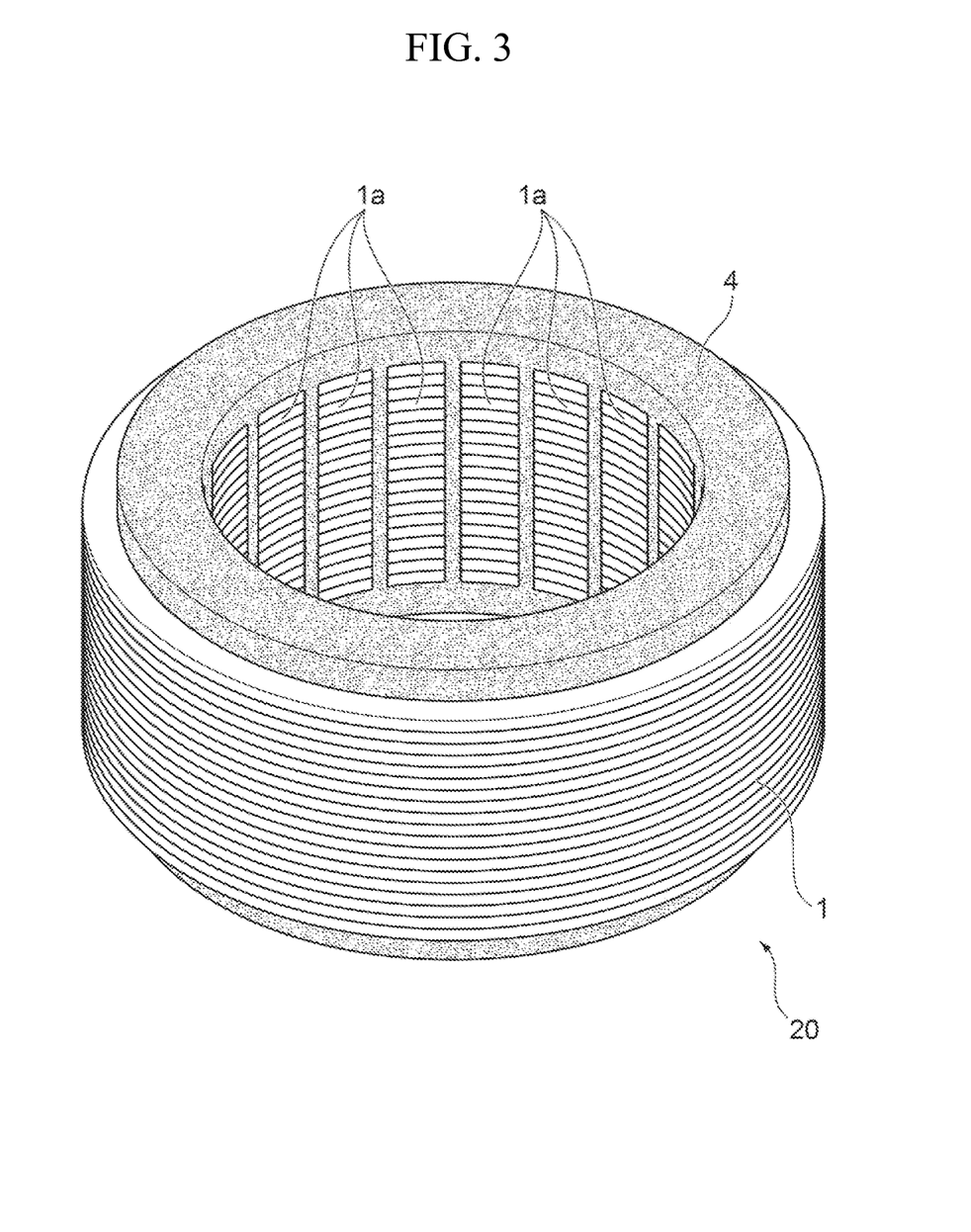
FIG. 3 is a perspective view illustrating a stator produced with the production method of the present invention.

Resin is sufficiently injected into the die M so that all of the teeth 1a and the insulators 2 with the coils 3 around the teeth 1a are surrounded by the resin. Then, after the resin has hardened, the components are removed from the die M, whereby a stator 20 is produced as shown in FIG. 3 in which the coils and the insulators around the teeth 1a of the stator core 1 are integrally sealed by a sealing resin body 4.

In the stator 20, the insulators 2 and the coils 3, which are the components of the stator 20, are arranged on the root side of the teeth 1a (i.e., on the outer side of the stator core 1), and further, the winding wire of the core 3 does not become loose. Thus, the stator 20 is a high-performance stator with small copper loss.

As the insulator 2 has only one fixed piece 2c, the labor for producing the insulator 2 as well as the production cost thereof can be reduced.

Further, the production method shown in the drawing is based on a simple process improvement that includes placing the components in the die M in the state in which one fixed piece 2c of the insulator 2 is disposed on the side of the injection gate Ma of the die M, and injecting resin into the die. Such production method does not increase the production cost at all.

Figure 4:
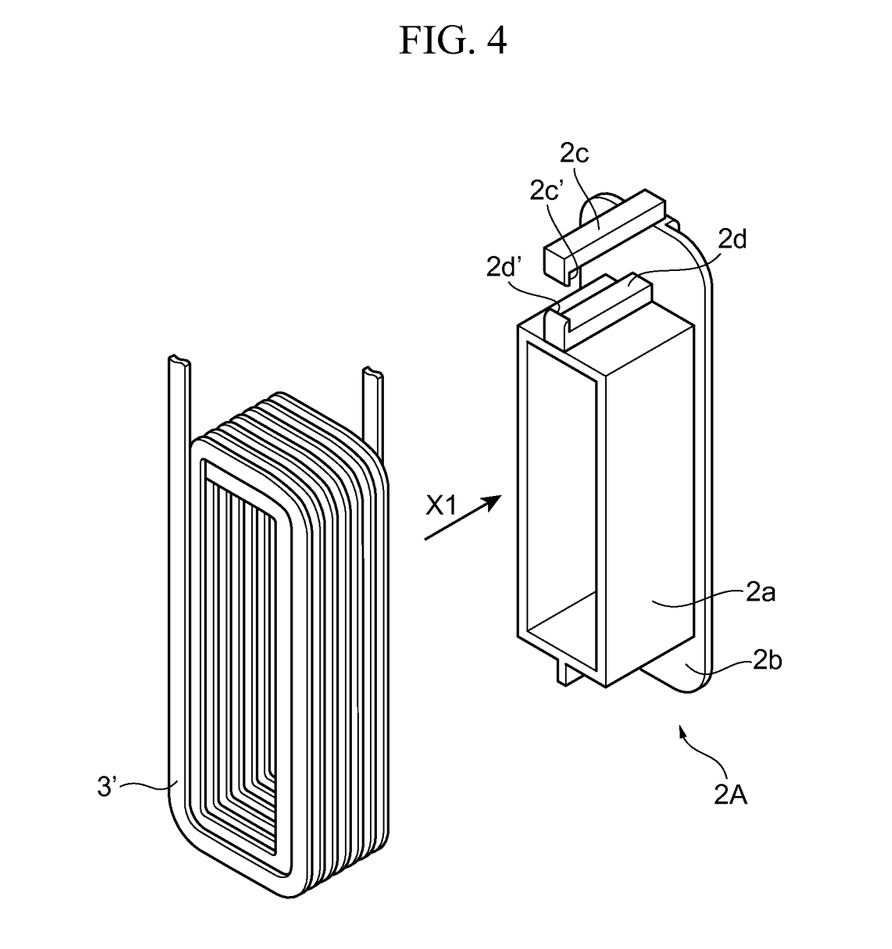
FIG. 4 is a schematic view showing a state in which a double-layer coil is disposed around an insulator that is compatible with double layer winding.

FIG. 4 shows an insulator 2A for latching a double-layer wound coil. For the conventional insulator for a double-layer wound coil, an insulator, which has two fixed pieces for latching the coil on the inner side and the coil on the outer side at each of the top and bottom of the tubular portion (i.e., a total of four fixed pieces), is used. However, herein, only two fixed pieces 2c and 2d for latching the coil on the inner side and the coil on the outer side, respectively, are provided at the top of the tubular portion 2a.

Of the double-layer wound coil 3', which is obtained by alternately winding a coil such that the inner space formed by every other turn is larger than the other and is disposed around the insulator 2A (in the X1 direction), the coil on the outer side is latched by a claw 2c' of the fixed piece 2c on the outer side, and the coil on the inner side is latched by a claw 2d' of the fixed piece 2d on the inner side.

Though not shown, the insulator 2A with the double-layer wound coil 3' is loosely fit around each tooth of the stator core so that an intermediate (not shown) is produced. Then, the intermediate is placed in a die such that the two fixed pieces 2c and 2d are arranged on the injection gate side of the die, and then, resin is injected into the die. Thus, it is possible to cause the pressure of the resin to act upon the inner side of the double-layer wound coil 3' while preventing loosening of the double-layer wound coils 3' as in FIG. 2B.

Such an insulator 2A for a double-layer wound coil can also have a reduced number of fixed pieces. Thus, the production cost of the insulator 2A can be reduced. As the loosening of the double-layer wound coil 3' can be prevented and the insulator 2A and the double-layer wound coil 3' can be positioned on the outer side of the stator core, it is possible to produce a high-performance stator with small copper loss.

Although the embodiments of the present invention have been described in detail above with reference to the drawings, specific structures are not limited thereto, and any design change that may occur within the spirit and scope of the present invention all fall within the scope of the present invention.

DESCRIPTION OF SYMBOLS

1 Stator core
1a Teeth 2,2A Insulator
2a Tubular portion
2b Flange
2c,2d Fixed piece
2c',2d' Claw
3 Coil
3' Double-layer wound coil
4 Sealing resin body
10 Intermediate
20 Stator
M Die
Ma Injection gate

What is claimed is:

1. A method for producing a stator, comprising:
   a first step of producing an intermediate by disposing a coil around an insulator, the insulator being adapted to be loosely fit around a tooth of a stator core and including a tubular portion adapted to be loosely fit around the tooth, a flange provided an one end of the tubular portion, and a single fixed piece that, when the insulator is loosely fit around the tooth, extends in a radial direction of the tooth from only one end side of the flange corresponding to one of an upper end face or a lower end face of the tooth, and has a coil latching claw at a tip end of the fixed piece, causing the coil to be latched by the claw, and loosely fitting the insulator with the coil around the tooth; and
   a second step of producing a stator by placing the intermediate in a die and injecting resin into the die from around a region where the coil is latched by the fixed piece, thereby forming a sealing resin body around the tooth and the coil.

2. The method for producing a stator according to claim 1, wherein
   the insulator includes a first fixed piece and a second fixed piece, the first fixed piece extending in the radial direction of the tooth from the end side, and the second fixed piece being provided around the first fixed piece, and
   a double-layer wound coil is latched by the insulator such that a first single-layer wound coil is latched by the first fixed piece, and a second single-layer wound coil is latched by the second fixed piece.

3. The method for producing a stator according to claim 1, wherein the first step includes producing the intermediate by loosely fitting the insulator with the coil around each tooth of the stator core.

4. The method for producing a stator according to claim 1, wherein the first step includes producing the intermediate by loosely fitting the insulator with the coil around a tooth of each split core, and fitting together each split core with the coil in a circumferential direction.

5. The method for producing a stator according to claim 2, wherein the first step includes producing the intermediate by loosely fitting the insulator with the coil around each tooth of the stator core.

6. The method for producing a stator according to claim 2, wherein the first step includes producing the intermediate by loosely fitting the insulator with the coil around a tooth of each split core, and fitting together each split core with the coil in a circumferential direction.

\* \* \* \* \*